(12) United States Patent
Roethler et al.

(10) Patent No.: US 7,100,723 B2
(45) Date of Patent: Sep. 5, 2006

(54) MULTIPLE PRESSURE MODE OPERATION FOR HYDRAULIC HYBRID VEHICLE POWERTRAIN

(75) Inventors: Bob Roethler, Howell, MI (US); Ron Kepner, Ann Arbor, MI (US); Robert Lippert, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 328 days.

(21) Appl. No.: 10/768,849

(22) Filed: Feb. 1, 2004

(65) Prior Publication Data

US 2005/0167177 A1   Aug. 4, 2005

(51) Int. Cl.
*B60K 6/12* (2006.01)
(52) U.S. Cl. ...... 180/165; 180/306; 180/307; 180/308
(58) Field of Classification Search ........ 180/305, 180/306, 307, 308, 165; 60/416
See application file for complete search history.

(56) References Cited

U.S. PATENT DOCUMENTS

| | | | | |
|---|---|---|---|---|
| 4,484,655 A | * | 11/1984 | Sheppard, Sr. ............ | 180/308 |
| 4,679,396 A | * | 7/1987 | Heggie ..................... | 60/414 |
| 5,540,299 A | * | 7/1996 | Tohda et al. .............. | 180/243 |
| 5,607,027 A | * | 3/1997 | Puett, Jr. .................. | 180/242 |
| 6,119,802 A | * | 9/2000 | Puett, Jr. .................. | 180/242 |
| 6,719,080 B1 | * | 4/2004 | Gray, Jr. ................... | 180/165 |
| 6,959,545 B1 | * | 11/2005 | Lippert et al. ............. | 60/430 |
| 6,971,232 B1 | * | 12/2005 | Singh ........................ | 60/414 |
| 6,971,463 B1 | * | 12/2005 | Shore et al. .............. | 180/165 |
| 2005/0016167 A1 | * | 1/2005 | Singh ........................ | 60/413 |

\* cited by examiner

*Primary Examiner*—Jeff Restifo
(74) *Attorney, Agent, or Firm*—David B. Kelley; MacMillan, Sobanski & Todd

(57) ABSTRACT

A system for a hydraulically driven vehicle includes a pump producing fluid flow at an outlet, pump-motors having variable flow rates for driving the wheels, a hydraulic rail having a pressure and connecting the pump and the pump-motors, sensors producing signals representing rail pressure, pump-motor speed, pump-motor displacement, and a controller for determining a target hydraulic system parameter, determining, based at least in part on the flow rate of the pump-motor, rail pressure, and a flow rate produced by the engine-pump, a flow rate produced by the engine-pump that is required to produce the target system parameter, and adjusting an engine operating parameter of a cylinder-pump bank such that the demanded magnitude of the system parameter is produced.

18 Claims, 2 Drawing Sheets

MULTIPLE PRESSURE MODE OPERATION FOR HYDRAULIC HYBRID VEHICLE POWERTRAIN

BACKGROUND OF THE INVENTION

The invention relates to a hydraulic hybrid powertrain for vehicles, particularly to a powertrain having an engine-pump for pressurizing a hydraulic system, an accumulator for energy storage, and pump-motors for driving the wheels.

In a hydraulic hybrid powertrain having a prime mover, such as an engine-pump that produces hydraulic flow at system pressure, and one or more pump-motors driving the wheels, it is desirable to operate at low system pressure to maximize the pump-motor efficiency during most operating conditions. There is, however, a mismatch in operating efficiency of the engine-pump and the efficiency of the pump-motors. The engine-pump has its highest efficiency at high system pressures. The pump-motors have their highest efficiency at lower system pressures.

It is desirable to operate at a high system pressure at times of peak demand, to achieve the required power with a smaller pump-motor. Also, system pressure is directly coupled to the stored energy state from regenerative braking. In a hydraulic hybrid, therefore, it is desired that rapid transitions occur between low system pressure and high system pressure, without incurring significant energy loss. This would allow normal operation at a low system pressure, and quick access to a higher peak torque level on demand. A powertrain operating this way would realize a significant improvement in system cycle fuel economy.

In a hydraulic hybrid powertrain, hydraulic flow at system pressure produced by the prime mover is used to drive one or more hydraulic pump-motors. Energy exceeding the current requirements of the powertrain is stored in a hydro-pneumatic accumulator. The pump-motors can provide regenerative braking. Kinetic energy of the vehicle produced by the pump-motors is recovered by a regenerative braking strategy and is stored in the accumulator. That energy can be supplied as required to the drive system from the accumulator. However, the system pressure necessarily decreases while the accumulator supplies this energy to the system. This drop in accumulator pressure reduces the available drive torque from the system.

It is desirable that the engine and storage accumulator are decoupled so that one pump-motor can use the stored energy to drive a first set of wheels, and another pump-motor can be powered by flow from the engine at pressure up to maximum system pressure to drive another set of wheels. This technique makes more total power available and better uses stored energy.

The magnitude of energy stored in an accumulator is approximately proportional to system pressure, and peak tractive output available from the pump-motors is also directly proportional to system pressure. Changing system pressure in this case requires a significant change in stored energy, and also takes time. This requires a compromise between drivability and use of energy storage to improve fuel economy.

SUMMARY OF THE INVENTION

The invention relates to a hydraulic hybrid powertrain consisting of an engine-pump assembly, accumulator energy storage, and pump-motors driving the wheels. All components are connected to operate at a common pressure, and drive torque is modulated by changing pump-motor displacement. In such a system, peak system drive torque, and often peak engine power, require a high system pressure. Hydraulic pump-motor torque is proportional to pump displacement and pressure drop.

For light load operation, such a cruising and light vehicle acceleration, a lower system pressure is desirable so that the pump-motors operate closer to maximum displacement, and at higher efficiency.

Multiple accumulators, at different pressure states, can be connected to the system through valves, so that a quick transition from a low to a high pressure state can be made. Vehicle torque capability is then decoupled from stored energy, allowing more ideal pressure scheduling and use of regenerative braking, without adverse performance effects. Engine power at peak pressure can be combined with power available from stored energy, through separate pump motors, to achieve instantaneous power greater than the total engine power.

A method according to this invention controls pressure in a hydraulic system, which includes an engine, a pump driven by the engine for supplying fluid to a hydraulic rail, first and second pump-motors supplied with fluid through the rail for driving a load, a main accumulator connected to the rail and containing fluid at a first pressure, and a power mode accumulator connected to the rail and containing fluid at a second pressure greater than the first pressure. The method includes the steps of monitoring a demand for an increase in a target parameter of the system. Communication is opened between the power mode accumulator and the rail, and communication is closed between the main accumulator and the rail after the demand occurs and before the target parameter is produced. A rate of fluid flow supplied by the pump to the rail is adjusted such that a combination of pressure in the rail and a rate of fluid flow to the pump-motors produces the target parameter.

In another aspect of this invention a system for transmitting power to the wheels of a vehicle includes an engine-pump for producing a fluid flow, and a hydraulic rail connecting the fluid flow from pump to the pump-motor. A first pump-motor is supplied with fluid through the rail for driving a first set of wheels. A first accumulator contains fluid at a first pressure, and a second accumulator contains fluid at a second pressure greater than the first pressure. A first control valve opens and closes a hydraulic connection between the first accumulator and the rail. A second control valve opens and closes a hydraulic connection between the second accumulator and the rail. A splitting valve, located on the rail between the first accumulator and the second accumulator, opens and closes a hydraulic connection between the first accumulator and the second accumulator.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
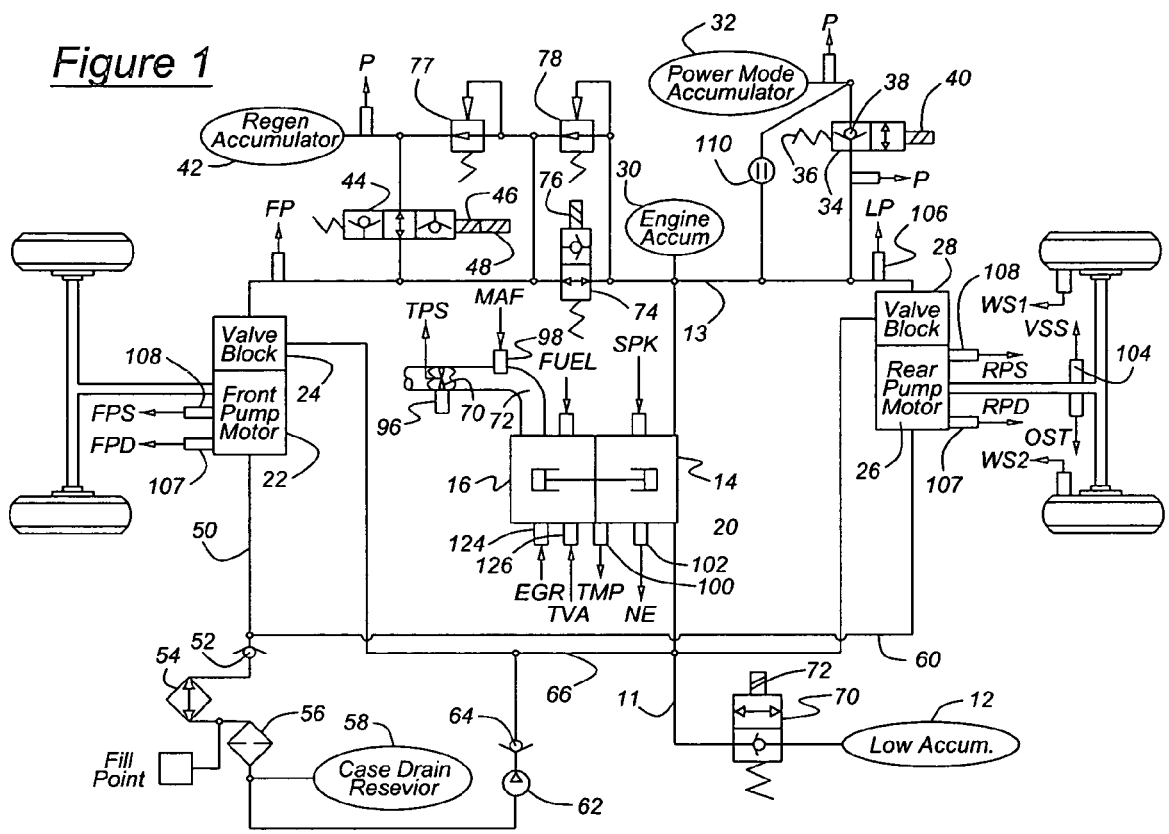
FIG. 1 is a schematic diagram of a hybrid hydraulic drive system for a vehicle to which the control of the present invention can be applied.
Figure 2:
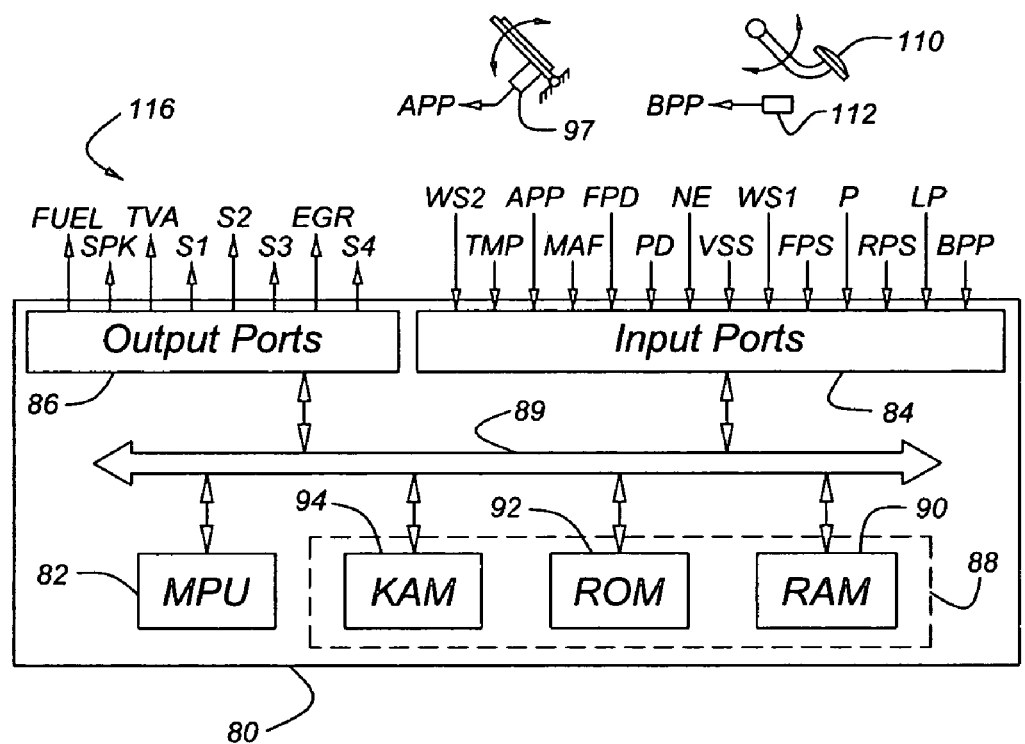
FIG. 2 is a schematic diagram of a control system applicable to the hybrid hydraulic system of FIG. 1.

Referring now to the system illustrated in FIG. 1, an engine-pump 10 assembly is supplied with hydraulic fluid from a low pressure line 11, which is hydraulically connected to a low pressure accumulator 12. A main hydraulic rail 13, which contains fluid pressurized at line pressure, is connected to the outlet of the pump 14. Preferably pump 14 is a variable displacement pump. Engine 16 is preferably an internal combustion engine, such as a gasoline or diesel engine having a crankshaft, or a free piston engine having either spark ignition or compression ignition. Engine 16 drives the pump 14 and produces output torque or output hydraulic flow in response to control of one or more engine operating parameters including engine airflow, the engine throttle position, engine ignition timing, and engine air-fuel ratio.

A check valve may be used to close a connection between line 11 and the pump inlet when inlet pressure exceeds pressure in line 11. A check valve may be used to close a connection between rail 13 and the pump outlet when pressure in rail 13 exceeds pressure at the pump outlet. Otherwise, these connections are open. The pump outlet is connected by rail 13 to a front pump-motor 22 and a rear pump-motor 26. The fluid flow rate produced by pump 14 is directly proportional to the pump displacement and its speed. Because of constraints on displacement and speed, power output by the engine 16 can be tightly constrained by line pressure, the pressure in rail 13. Therefore, power output by the engine 16 is closely related to line pressure, the pressure in rail 13.

The front hydraulic pump-motor 22 is supplied with fluid through a valve body 24 connected to rail 13. Pump-motor 22 is driveably connected to the front wheels of a motor vehicle. Similarly, the rear hydraulic pump-motor 26 is supplied with fluid through a valve body 28, connected to rail 13. The rear wheels of the vehicle are driven by pump-motor 26. The front and rear pump-motors 22, 26 are variable displacement hydraulic pumps, each pump having a maximum displacement or volumetric flow rate per revolution.

When an increase of torque or power must be delivered to the front wheels and rear wheels through the pump-motors 22, 26 while those pump motors are operating at maximum displacement, the pressure of fluid supplied to the pump motors must be increased in order to increase the output power from the pump-motors. When an increase of power must be delivered from the engine pump 14, while pump 14 is operating at its maximum flow, the pressure of fluid at the pump outlet must be increased in order to increase the output [hydraulic] power from the pump. During normal operation, when the wheels are being driven, the pump-motors 22, 26 generate torque due to fluid flow from rail 13 through the pump-motors to low pressure line 11. When the wheel brakes are braking the vehicle, the direction of torque and direction of fluid flow are reversed. Disregarding losses, torque is proportional to the product of displacement and pressure difference. Flow rate is proportional to the product of speed and displacement.

The fluid outlet of the engine 16, from which rail 13 is supplied, is connected to an engine accumulator 30, which buffers or attenuates hydraulic pressure pulses produced by variations in engine speed and its inertia. A high pressure or power mode accumulator 32 communicates with rail 13 through a valve 34. A spring 36 biases valve 34 to the position shown in FIG. 1, where check valve 38 closes a hydraulic connection between accumulator 32 and rail 13 when pressure in the accumulator is greater than rail pressure, and opens that connection when rail pressure is greater than the accumulator pressure. When electric current actuates solenoid 40, it overcomes the effect of spring 36 and moves the valve to a second state, where a hydraulic connection between accumulator 32 and rail 13 is open through the valve 34.

A brake regeneration accumulator 42 stores energy recovered during the process of braking the drive wheels of the motor vehicle and stores that energy in the form of relatively high pressure hydraulic fluid. In accordance with the state of two control solenoids 46, 48, accumulator 42 is connected to and disconnected from rail 13 through a regen shutoff/powermode valve 44, or multiple valves arranged in series. Valve 44 has a first state in which accumulator 42 is open to rail 13 regardless of the differential pressure across the valve, a second state that closes a hydraulic connection between accumulator 42 and rail 13 when pressure in the accumulator is greater than rail pressure, and a third state that opens that connection when rail pressure is less than the accumulator pressure.

The case outlet of the front pump-motor 22 is connected through line 50 and check valve 52 to a heat exchanger 54, filter 56, and case drain reservoir 58. Similarly, the case outlet of the rear hydraulic pump-motor 26 is connected through line 60 to the case drain reservoir 58. A recovery pump 62 draws hydraulic fluid from the reservoir 58 and supplies fluid to the system through a check valve 64 and line 66. Line 66, which mutually connects the valve blocks 24, 28 and a low pressure accumulator 12, communicates hydraulically also with the inlet side of the pump 14. The solenoid 72 that operates valve 70 is energized as required to ensure that the positive pressure in accumulator 12 is present also at the inlets of the pump-motors 22, 26 and pump 14.

A splitting valve 74 has a first state that allows open communication between main accumulator 42, the front pump-motor 22, the pump 14, and the rear pump-motor 26. A second state of valve 74 divides the system in half when line pressure in rail 13, at the left-hand side of the valve 74, is greater than line pressure at the right-hand side of the valve and opens that connection when line pressure in rail 13 at the right-hand side of the valve is greater than line pressure at the left-hand side of the valve. A solenoid 76 controls the state of the valve 74. The main accumulator 42 and the front pump motor 22 are to the left hand side of the valve 74, and the pump 14 and the rear pump motor 26 are to the right-hand side of the valve 74. Pressure relief valves 77, 78 allow fluid flow from rail 13 to main accumulator 42, if valves 44 and 74 do not react quickly enough to limit a rapid increase in rail pressure. Valves 77, 78 minimize loss of energy in the system by providing a path between rail 13 to accumulator 42, where the energy is stored in the form of a pressurized volume of fluid.

The hydraulic fluid volume capacity of accumulators 32, 42 is about 10–11 gallons each. The pressure maintained in power mode accumulator 32 is about 5,000 psi. The pressure maintained in main accumulator 42 varies over a range that is principally determined by the frequency and degree of recovery of vehicle kinetic energy resulting from brake regeneration.

A controller 80, preferably a microprocessor-based controller, provides integrated control of the engine 16 and the hydraulic system. The engine and system may be controlled instead by a separate engine controller and system controller, depending upon the particular application. Controller 80 includes a microprocessor 82 in communication with input ports 84, output ports 86, and computer readable media 88 via a data/control bus 89. Computer readable media 88 may include various types of volatile and nonvolatile memory such as random access memory (RAM) 90, read-only memory (ROM) 92, and keep-alive memory (KAM) 94. These functional descriptions of the various types of volatile and nonvolatile storage may be implemented by any of a number of known physical devices including, but not limited to PROMs, EPROMs, EEPROMs, flash memory, and the like. Computer readable media 88 include stored data and instructions executable by microprocessor 82 to implement the method for controlling operation of the engine 16, pump 14, pump-motors 22, 28, and solenoids 40, 46, 48, 72, 74. The system and its components are controlled in accordance with commands produced by the controller as a result of repetitive execution of control algorithms stored in electronic memory on computer readable media 88.

Various sensors, in communication with the corresponding input ports 84 of controller 80, monitor and produce signals representing the current operating conditions of the engine, hydraulic system, and vehicle. Information is also provided by driver inputs. The engine parameter sensors preferably include an engine throttle position sensor (TPS) 96, which monitors the position of engine throttle valve, disposed within the engine intake. An accelerator pedal position (APP) sensor 97 may be substituted for the TPS. An accelerator pedal is operated manually by the driver to produce a demand for an output, such as torque output by the powertrain or vehicle speed. A pedal position sensor generally provides as an output, either a voltage or possibly a digital signal, which is interpreted by the controller as a software value often referred to as counts.

A mass airflow sensor (MAF) 98 provides an indication of the air mass flowing through the engine intake. A temperature sensor (TMP) 100 provides an indication of the engine coolant temperature, or engine oil temperature. An engine speed sensor (NE) 102 monitors the speed of engine 16. A rotational speed sensor, vehicle speed sensor (VSS) 104, provides an indication of the speed of the vehicle derived from the speed of the axles, driveshaft, or individual wheels. Other sensors may be required depending on the type of engine used.

The hydraulic system input sensors preferably include a pressure sensor 106, which monitors and produces a signal representing the magnitude of line pressure in rail 13 (LP), as well as other pressure sensors, for example, for accumulators 32, 42 and 12. Swashplate angle sensors (FPD) (RPD) 107 produce a signal representing the current angular position of the swashplates of the front axle and rear axle pump-motors 22, 26, respectively. Pump-motor speed sensors (FPS) (RPS) 108 produce a signal representing the current speed of the front axle and rear axle pump-motors 22, 26, respectively. The corresponding swashplate angular position is proportional to displacement of the front motor-pump 22 (FPD) and displacement of the rear pump-motor 28 (RPD). Temperature sensors monitor the system temperature so that action can be taken in the case of system temperatures being outside of desired limits.

A brake pedal 112, controlled by the driver, includes a pedal position sensor 112, which provides an indication of the position of brake pedal (BPP), or the applied and released states of the brake pedal. The braking system may include additional features to enable more effective regenerative braking. Pressure sensors (P) produce signals representing the pressure in accumulators 12, 32, 42.

Depending upon the particular application requirements, various sensors may be omitted, or alternative sensors may be provided that generate signals indicative of related monitor parameters. Values corresponding to ambient or operating conditions may be inferred or calculated using one or more of the sensed parameters without departing from the spirit or scope of the present invention. For example, vehicle speed can be inferred or calculated from speed signals produced by wheel speed sensors (WS1) (WS2).

In addition to the sensors described above, actuators, indicated generally by reference numeral 116, communicate with controller 80 via output ports 86 to control the engine 16, hydraulic system and vehicle in response to commands generated by the controller 80. Actuators 116 may include actuators for timing and metering fuel (FUEL) 120, controlling ignition angle or timing (SPK) 122, setting the amount of exhaust gas recirculation (EGR) 124, and adjusting the intake air using the engine throttle valve with an appropriate servomotor or actuator (TVA) 126. Signal (S1, S2, S3, S4) produced by controller 80 control the state of solenoids 40, 46, 48, 72, 74.

The control can be implemented in the hydraulic hybrid powertrain of FIG. 1. The power mode accumulator 32 is hydraulically isolated from the regen or main accumulator 42 and system by splitting valve 74 and valve 34, or the valve 111 ranged in parallel with hydraulic valve 34 The power mode accumulator 32 generally is maintained at a higher pressure than the pressure in the rail 13 and the system.

When a demand for increased wheel torque is produced by the vehicle operator's control of the accelerator pedal (APP), a power mode can be activated, at the discretion of the control strategy, in which splitting valve 74 is open and in the state shown in FIG. 1, the main accumulator 42 is closed off from the rail 13 by regen shutoff/powermode valve 44, and the engine 16-pump 14 produces fluid flow in excess of that currently used by the pump-motors 22, 26. The increase in fluid flow from pump 14 is accomplished by increasing engine-pump speed, or by increasing displacement of pump 14, or a combination of engine-pump speed and pump displacement increases. Line pressure in rail 13 rises as a result of the excess flow produced by pump 14, and as it exceeds the pressure of the power mode accumulator 32, the valve 34 will allow flow will allow flow into the accumulator 32, and the valve 34 can then be switched to a state that allows flow in both directions without any disturbance such as from a sudden rush of fluid flow. The system then operates at a relatively high rail pressure while higher drive torque is needed at the wheels.

In an alternative arrangement, a flow control bypass valve 110 having an orifice of predetermined diameter is arranged in parallel with valve 34. Valve determines the rate of fluid flow between accumulator 32 and rail 13, and operates to raise line pressure in rail 13 more quickly than control valve 34.

When a demand for increased torque has been met or is otherwise absent, the flow from engine pump 14 is reduced, and the state of valve 34 is adjusted so that the power mode accumulator 32 is closed, thereby trapping in accumulator 32 the relatively high pressure present in rail 13 during the demand for increased wheel torque. Rail pressure then falls to the magnitude of pressure in the main accumulator 42, which is reconnected to the system by changing the state of valve 44 to the fully opened state, after it begins to allow flow out of the accumulator 42 due to its behavior as a check valve.

The magnitude of pressure in main accumulator 42 is a measure of the magnitude of energy stored in the main accumulator 42. If the main accumulator 42 contains sufficient stored energy, i.e., a magnitude of energy sufficient to meet a demand for torque at a set of wheels, such as to accelerate the vehicle from a stopped condition to 20 mph, the splitting valve 74 may be closed, so that energy stored in main accumulator 32 only supplies fluid to one of the pump-motors 22,26, preferably the front pump-motor 22. The other pump-motor 26 is then supplied with fluid from the engine 16-pump 14, and engine 16-pump 14 and pump-motor 26 both operate at a pressure above the pressure in the main accumulator 42 to drive the rear wheels. Pump-motor 26 produces more power or torque at the rear wheels due to the higher pressure in rail 13 than if pump-motor 26 were in communication with the main accumulator 42.

The attached schematic covers one possible system implementation. The system includes a single power mode accumulator 32 and two possible pressure modes, power mode and split power mode. However, additional power accumulators may be incorporated, allowing additional independent pressure levels, and transitions to the additional pressure levels. Piloted check valves are used for the state transitions, and are arranged to allow opening and closing events to occur by the check valve when there is no differential pressure across the check valve.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method for controlling pressure in a hydraulic system that includes an engine, a pump driven by the engine for supplying fluid to a hydraulic rail, first and second pump-motors supplied with fluid through the rail for driving a load, a main accumulator connected to the rail and containing fluid at a first pressure, a power mode accumulator connected to the rail and containing fluid, and a low pressure accumulator, comprising the steps of:
    communicating the low pressure accumulator with a low pressure outlet of the pump-motors;
    monitoring a demand for an increase in a target parameter of the system;
    closing communication between the main accumulator and the rail after the demand occurs and before the target parameter is produced;
    adjusting a rate of fluid flow supplied by the pump to the rail such that a combination of pressure in the rail and a rate of fluid flow to the pump-motors produces the target parameter; and
    opening communication through the rail between the power mode accumulator and high pressure inlet of at least one pump-motor.

2. The method of claim 1, wherein the step of adjusting a rate of fluid flow further comprises the steps of:
    determining, based at least in part on a flow rate of the pump-motors, displacement of the pump and pressure in the rail, a flow rate of the pump that would produce the target parameter; and
    changing an engine parameter to increase the flow rate of the pump that would produce the target parameter.

3. The method of claim 1, wherein the step of adjusting a rate of fluid flow further comprise the steps of:
    determining a combination of a flow rate of the pump-motors, a displacement of the pump, a pressure in the rail, and a flow rate of the pump that would produce the target parameter; and
    increasing flow rate of the pump to produce the target parameter in combination with the determined flow rate of the pump-motors, displacement of the pump, and pressure in the rail.

4. The method of claim 1, wherein the step of adjusting a rate of fluid flow further comprise the steps of:
    determining a combination of a flow rate of the pump-motors, a displacement of the pump, a pressure in the rail, and a speed of the engine and pump that would produce the target parameter and
    increasing the speed of the engine and pump to produce the target parameter in combination with the determined flow rate of the pump-motors, displacement of the pump, pressure in the rail.

5. The method of claim 1, further comprising the step of closing communication between the power mode accumulator and the rail when the target parameter is produced; and
    opening communication between the main accumulator and the rail after the target parameter is produced.

6. The method of claim 1, further comprising the step of:
    closing communication between the power mode accumulator and the rail allowing pressure in the power mode accumulator to fall below a predetermined pressure; and
    opening communication between the main accumulator and the rail after pressure in the rail falls to the pressure of the main accumulator.

7. The method of claim 1, wherein the system further includes an accelerator pedal, and the step of monitoring a demand for an increase in a target parameter further comprises the step of monitoring a change in the position of the accelerator pedal.

8. The method of claim 1, further comprising the steps of:
    monitoring the magnitude of energy stored in the main accumulator;
    opening communication between the main accumulator and the first pump-motor if the magnitude of energy stored in the main accumulator is equal to or greater than a predetermine magnitude; and
    closing communication between main accumulator and the second pump-motor if the magnitude of energy stored in the main accumulator is equal to or greater than the predetermine magnitude.

9. The method of claim 1, further comprising the steps of:
    monitoring the magnitude of energy stored in the main accumulator;
    opening communication between the main accumulator and the first pump-motor if the magnitude of energy stored in the main accumulator is equal to or greater than a predetermine magnitude;
    closing communication between main accumulator and the second pump-motor if the magnitude of energy stored in the main accumulator is equal to or greater than the predetermine magnitude; and
    closing the supply of fluid from the pump to the first pump-motor if the magnitude of energy stored in the main accumulator is equal, to or greater than the predetermine magnitude.

10. The method of claim 1 wherein the target parameter is torque produced by the motor-pumps.

11. A system for transmitting power to the wheels of a vehicle comprising:
    an engine-pump for producing a fluid flow;
    a hydraulic rail having a pressure and connecting the fluid flow from pump to the pump-motor;
    a first pump-motor supplied with fluid through the nil for driving a first set of wheels;
    a high pressure accumulator containing fluid at a relatively high pressure;
    a power mode accumulator for containing fluid;

a low pressure accumulator communicating with a low pressure outlet of the first pump-motor;

a device for indicating a demanded operating parameter of the system;

a first control valve for opening and closing a hydraulic connection between the high pressure accumulator and the rail;

a second control valve for opening and closing a hydraulic connection between the power mode accumulator and the rail; and a controller determining a demand for a target parameter of the system, opening communication between the power mode accumulator and the rail, closing communication between the high pressure accumulator and the rail after the demand occurs and before the target parameter is produced, and adjusting a rate of fluid flow supplied by the pump to the rail such that a combination of pressure in the rail and a rate of fluid flow to the pump-motors produces the target parameter.

12. The system of claim 11, wherein the controller further comprises:

determining, based at least in part on a flow rate of the pump-motors, displacement of the engine-pump, and pressure in the rail, a flow rate of the engine-pump that would produce the target parameter; and changing an engine parameter to increase the flow rate of the engine-pump that would produce the target parameter.

13. The system of claim 11, wherein the controller further comprises:

determining a combination of a flow rate of the pump-motors, a displacement of the engine-pump, a pressure in the rail, and a flow rate of the engine-pump that would produce the target parameter; and increasing flow rate of the engine-pump to produce the target parameter in combination with the determined flow rate of the pump-motors, displacement of the engine-pump, and pressure in the rail.

14. The system of claim 11, wherein the controller further comprises:

determining a combination of a flow rate of the pump-motors, a displacement of the engine-pump, a pressure in the rail, and a speed of the engine-pump that would produce the target parameter; and increasing the speed of the engine-pump to produce the target parameter in combination with the determined flow rate of the pump-motors, displacement of the engine-pump, and pressure in the rail.

15. The system of claim 11, wherein the controller further comprises:

closing communication between the power mode accumulator and the rail when the target parameter is produced and opening communication between the main high pressure accumulator and the rail after the target parameter is produced.

16. The system of claim 11, wherein the system further comprises a splitting valve disposed on the rail between the high pressure accumulator and the power mode accumulator for opening and closing a hydraulic connection between the high pressure accumulator and the power mode accumulator, the controller further comprises:

monitoring the magnitude of energy stored in the high pressure accumulator based at least in part on the pressure in the high pressure accumulator;

operating the splitting valve to open communication between the main high pressure accumulator and the first pump-motor if the magnitude of energy stored in the high pressure accumulator is equal to or greater than a predetermine magnitude; and operating the splitting valve to close communication between high. pressure accumulator and the second pump-motor if the magnitude of energy stored in the high pressure accumulator is equal to or greater than the predetermine magnitude.

17. The system of claim 11, wherein the system further comprises splitting valve disposed on the rail between the high pressure accumulator and fine power mode accumulator for opening and closing a hydraulic connection between the high pressure accumulator and the power mode accumulator, the controller further comprises:

monitoring the magnitude of energy stored in the main high pressure accumulator;

operating the splitting valve to open communication between the high pressure accumulator and the first pump-motor if the magnitude of energy stored in the high pressure accumulator is equal to or greater than a predetermine magnitude;

operating the splitting valve to close communication between high, pressure accumulator and second pump-motor if the magnitude of energy stored in the high pressure accumulator is equal to or greater than the predetermine magnitude; and operating the splitting valve to close the supply of fluid from the engine-pump to the first pump-motor if the magnitude of energy stored in the high pressure accumulator is equal to or greater than the predetermine magnitude.

18. A system for transmitting power to the wheels of a vehicle comprising:

an engine-pump for producing a fluid flow;

a hydraulic rail having a pressure and connecting the fluid flow from pump to the pump-motor;

a pump-motor supplied with fluid through the rail for driving a first set of wheels;

a high pressure accumulator containing fluid at a relatively high pressure;

a power mode accumulator containing fluid at a second pressure a low pressure accumulator communicating with a low pressure outlet of the pump-motor;

a first control valve for opening and closing a hydraulic connection between the high pressure accumulator and the rail;

a second control valve for opening and closing a hydraulic connection between the power mode accumulator and the rail; and a splitting valve disposed on the rail between the tint high pressure accumulator and the power mode accumulator for opening and closing a hydraulic connection between the high pressure accumulator and the power mode accumulator.

* * * * *